July 3, 1956  G. E. MARVIN  2,752,988
LOCK FOR FOLDING AUTO SEATS
Filed Dec. 9, 1952
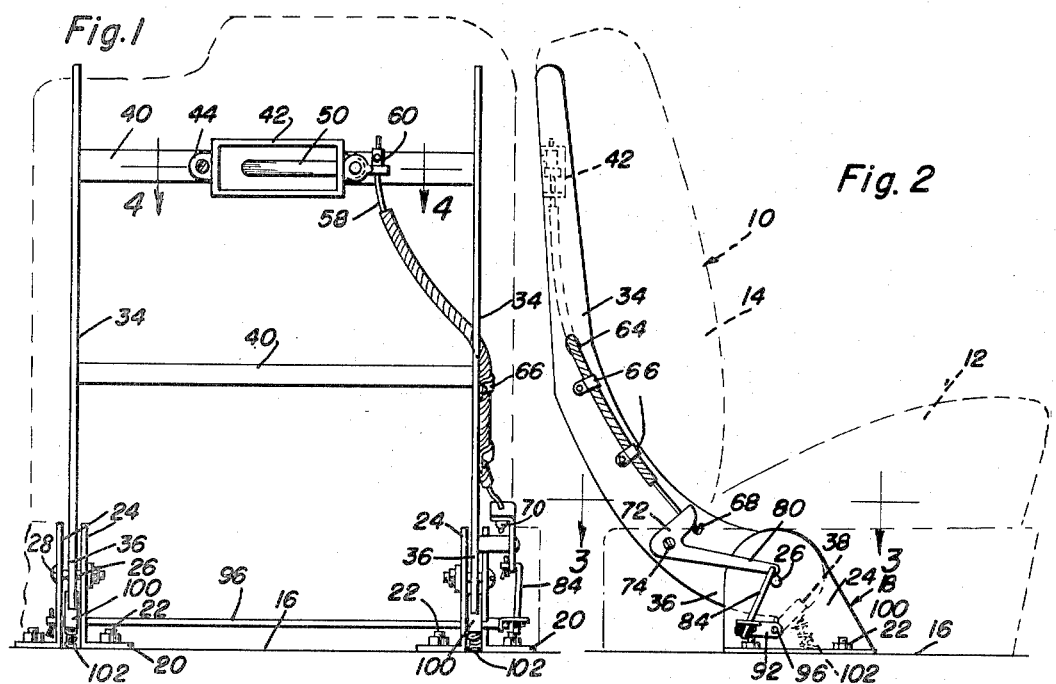
Grant Emerson Marvin
INVENTOR.

ant Office 2,752,988
Patented July 3, 1956

2,752,988
LOCK FOR FOLDING AUTO SEATS
Grant Emerson Marvin, Waterloo, Iowa Application December 9, 1952, Serial No. 324,914

1 Claim. (Cl. 155—162)

This invention relates to folding seat structures and more particularly to front seats for automobiles.

A primary object of this invention is to provide a folding seat affording a maximum of protection to occupants of an automobile in the event of an accident.

Another object is to provide a folding seat having improved means for latching the same in proper position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevation of a seat structure formed in accordance with this invention, Figure 2 is a side elevation of the same, Figure 3 is a horizontal section of the latching structure and associated mechanism taken substantially along line 3—3 of Figure 2, Figure 4 is a horizontal section of the latch release mechanism taken substantially along line 4—4 of Figure 1, and Figure 5 is a detail view of the latch mechanism in perspective.

Referring now more particularly to Figure 2 it will be seen that the reference numeral 10 indicates a seat structure generally, while numeral 12 indicates a seat or bench thereof and numeral 14 indicates a folding back. Seat 12 is secured to a base 16 in any suitable manner, such base constituting the floor of a motor vehicle or the like, if so desired. Also secured to the base are spaced pairs of angle brackets indicated generally as 18. Each bracket comprises a base portion 20, secured by any suitable means such as bolts 22 to the base or floor 16, and an upstanding portion 24. The brackets constituting each pair are disposed in closely spaced opposed relation, each upstanding portion being apertured to receive the pivot pins 26. One end of each pin 26 is provided with a head 28 and the other end is threaded to receive a nut 30 cooperating with lock washer 32 in effectively securing each pivot pin.

A pair of vertical frame members 34 have lower portions 36 disposed between upstanding portions 24 of respective pairs of brackets 18. These lower portions are apertured to pivotally receive pins 25 and are notched as at 38 for a purpose herinafter described.

The main portions of frame members 34 extend rearwardly and upwardly from brackets 18. Transverse frame members 40 interconnect intermediate and upper portions of members 34, forming a frame upon which the seat back 14 is formed.

Upper transverse member 40 has a housing 42 secured to its rear face. The housing is provided with apertured ears 44 in register with holes in the upper transverse member. A conventional bolt 46 secures one ear to the member 40, another bolt 48 serving to secure the other ear in addition to function as a pivot for release handle 50. Space ring 52 maintains handle 50 in proper position within the housing and an elongated slot 54 permits free pivotal handle movement through the housing. Beyond pivot 48, free end 56 of release handle 50 operatively engages a Bowden wire 58. This operative engagement is conventional, that is, the Bowden wire extends through an aperture in free end 56 and stop collar 60 is stationarily held thereon by setscrew 62. From the release handle, Bowden wire 58 extends downwardly, through the hole 64 in member 34, to a point adjacent the lower end 36 of such member. Conventionally, intermediate portions of the Bowden wire outer casing are secured to frame member 34, as by clips 66.

Lower end 68 of the Bowden wire is operatively engaged, in like manner to its upper end, by stop collar 70 to one end 72 of a bellcrank pivoted to the frame member 34. For this purpose, pivot bolt 74, similar to bolt 48, is provided, spacer 76 operating in like manner to spacer 52. The end portion of the bellcrank with which the Bowden wire is engaged is formed as an ear 78 bent at right angles to the main portion of the crank. Through a hole in the other end 80 of the crank an angular end 82 of a rod 84 is disposed and cotter pin 86 prevents disengagement of the rod end from crank 80.

The other end of rod 84 pivotally extends through a hole 88 in ear 90 of lever 92. A boss 94 on the lever receives a latch rod 96, setscrew 98 securing the two together in a well known manner. Also secured to latch rod 96 by a setscrew 99 is a latch 100 which is engageable in notch 38, previously described. A latch is provided at each end of the latch rod. For the purpose of supporting the latch rod, the same is journaled in holes provided in the brackets 18. In order that latches 100 normally engage notches 38, springs 102 are disposed between base 16 and the latches.

Thus it will be seen that the seat back 14 will normally be prevented from pivoting with respect to seat 12 until release handle 50 is pressed downwardly to pivot the latches out of engagement with notches 38.

This construction is particularly useful in automobiles of the two door variety. Usually these models have pivoted seat backs allowing ease of entrance into the rear seat thereof. Normally, the pivotal feature is not objectionable, however, in the event of accident or collision, it frequently happens that rear passengers are seriously injured due to the fact that the pivoted seat backs do not present any support for such passengers when they are thrown forwardly. By utilizing the invention herein disclosed, such injuries are largely obviated as the seat backs are latched against forward pivoting.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A structure of the character described comprising a base, a seat secured to said base, said base having a pair of spaced brackets secured in upstanding relation thereto adjacent each opposite end of said seat, a seat back including elongated side frame members pivotally secured at their lower ends between corresponding pairs of brackets, said lower ends of the frame members being notched, a latch rod having its opposite ends projecting through said pairs of brackets, a pair of latches secured to said rod and each disposed between the brackets of each pair, resilient means on said base urging said latches for normally seating the same in the notches in the lower ends of said frame members, and means for pivoting said latch rod to disengage said latches from their corresponding notches, said last named means including a lever secured to one free end of said latch rod, said lever having a lateral ear, a bellcrank pivotally secured above said lever to one of said frame members, said bellcrank having an upright rod pivotally connected to said ear and operatively connecting said bellcrank to said ear, and a handle on said back operatively connected to said bellcrank.

References Cited in the file of this patent

UNITED STATES PATENTS

| | | |
|---|---|---|
| 1,224,982 | Washeim | May 8, 1917 |
| 1,564,593 | Lawrence | Dec. 8, 1925 |
| 1,596,316 | Singleton | Aug. 17, 1926 |
| 1,677,434 | Dorton | July 17, 1928 |
| 1,780,468 | Fujita | Nov. 4, 1930 |
| 2,199,467 | Saunders | May 7, 1940 |
| 2,559,548 | Seigneur | July 3, 1951 |

FOREIGN PATENTS

| | | |
|---|---|---|
| 398,737 | Great Britain | Sept. 21, 1933 |